Figure 12A:
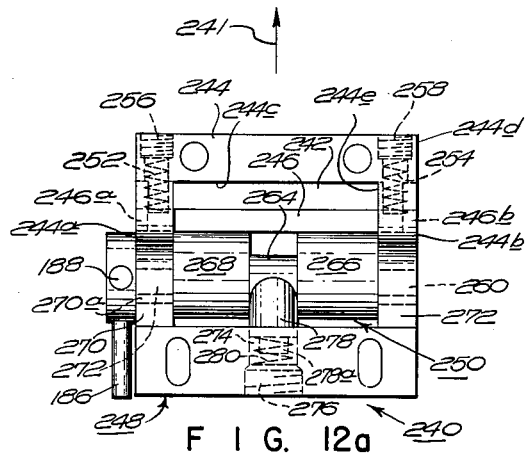

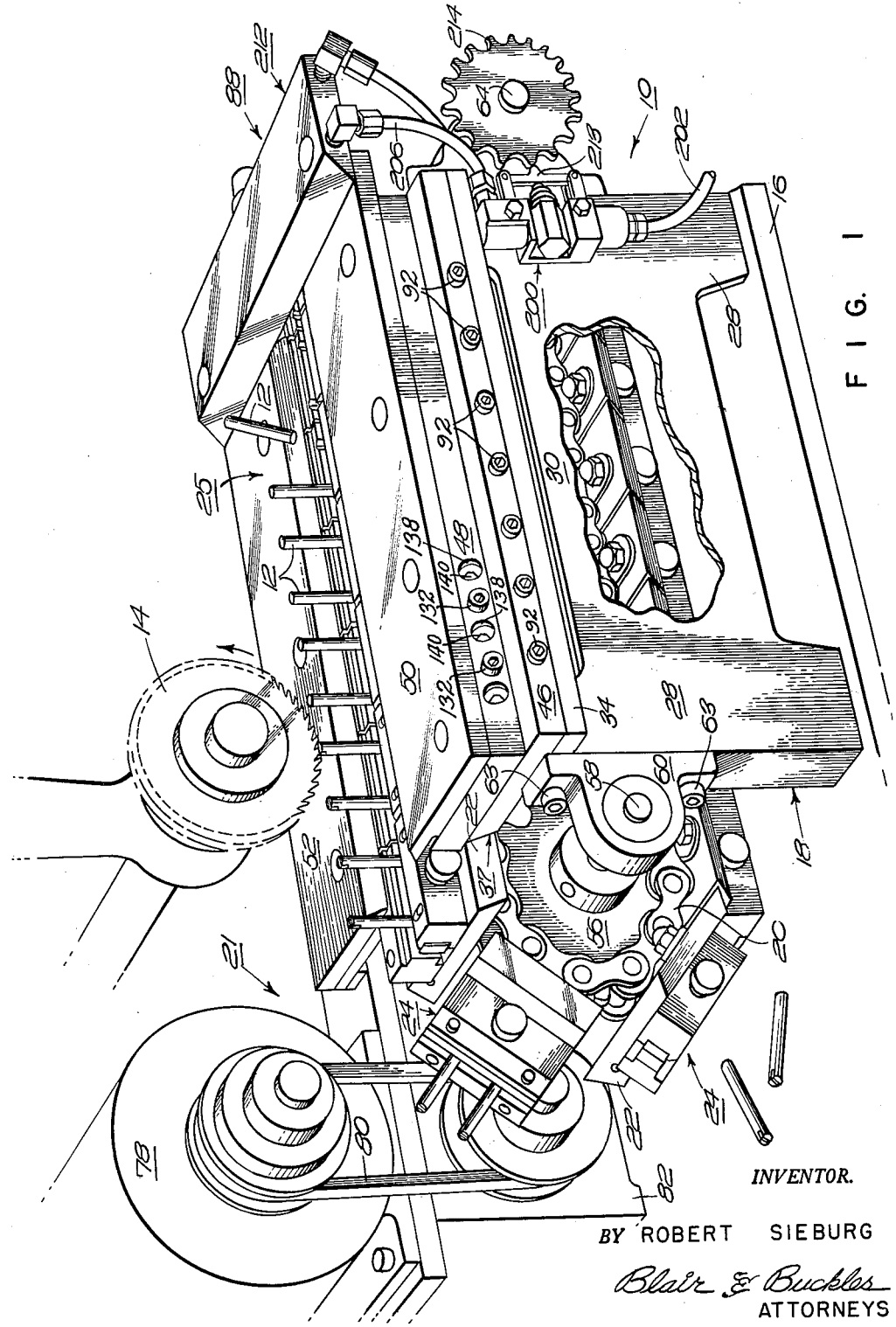

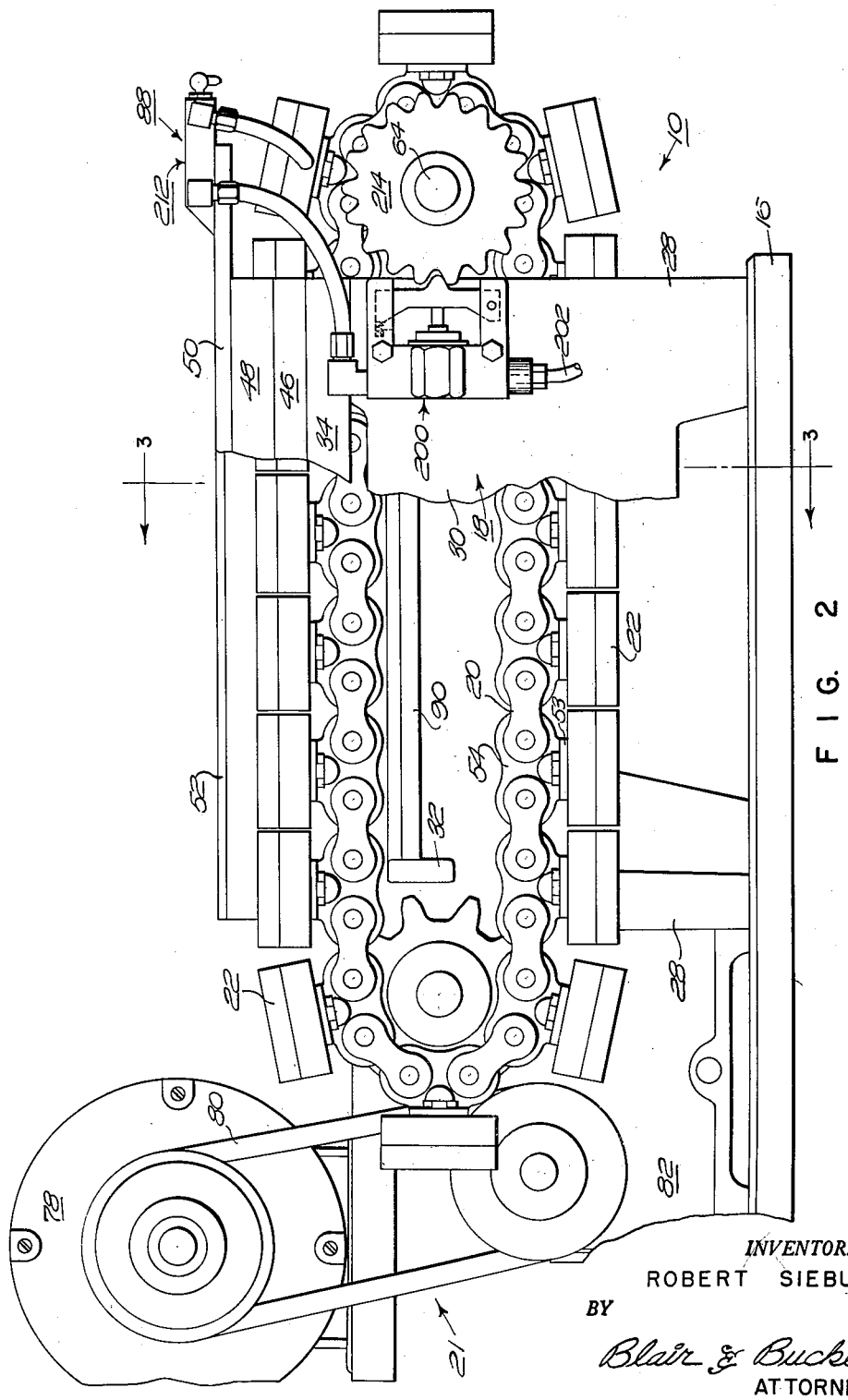

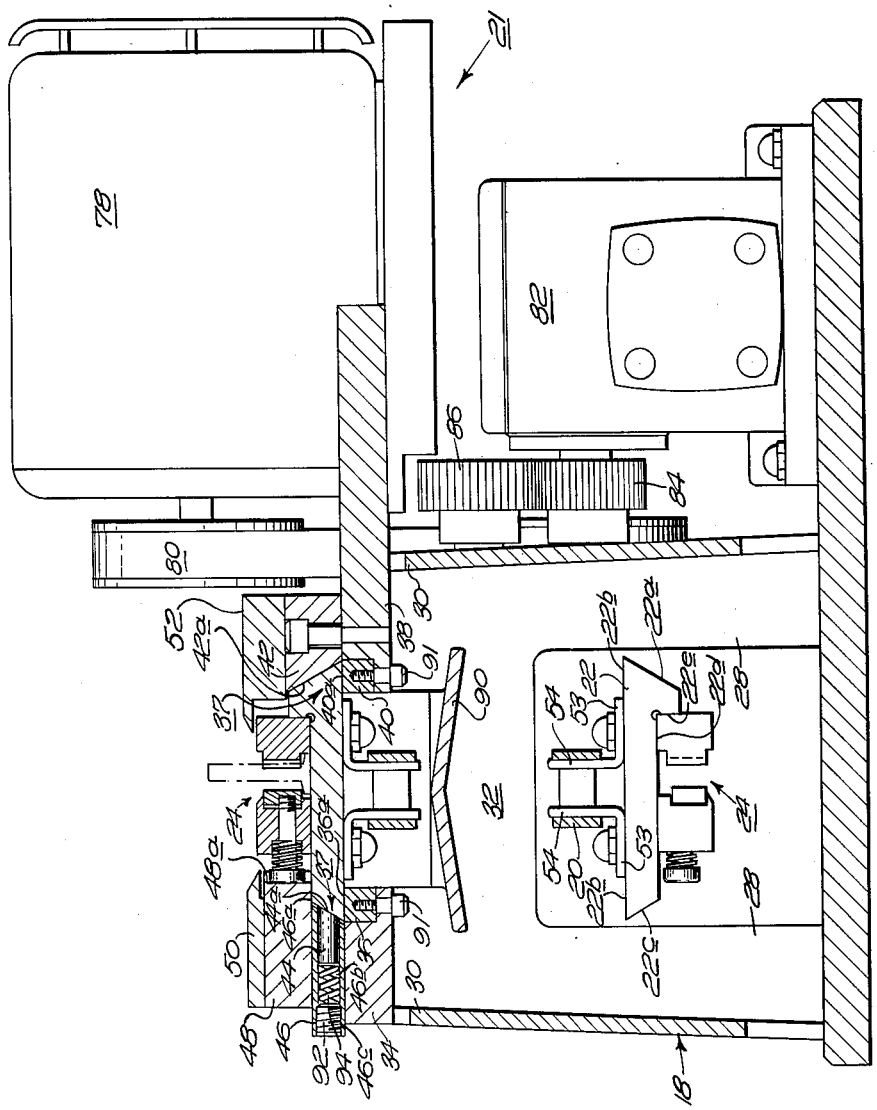

Feb. 19, 1963 R. SIEBURG 3,077,973
WORK FEEDING SYSTEMS FOR MACHINING OPERATIONS
Filed Nov. 9, 1960 8 Sheets-Sheet 4
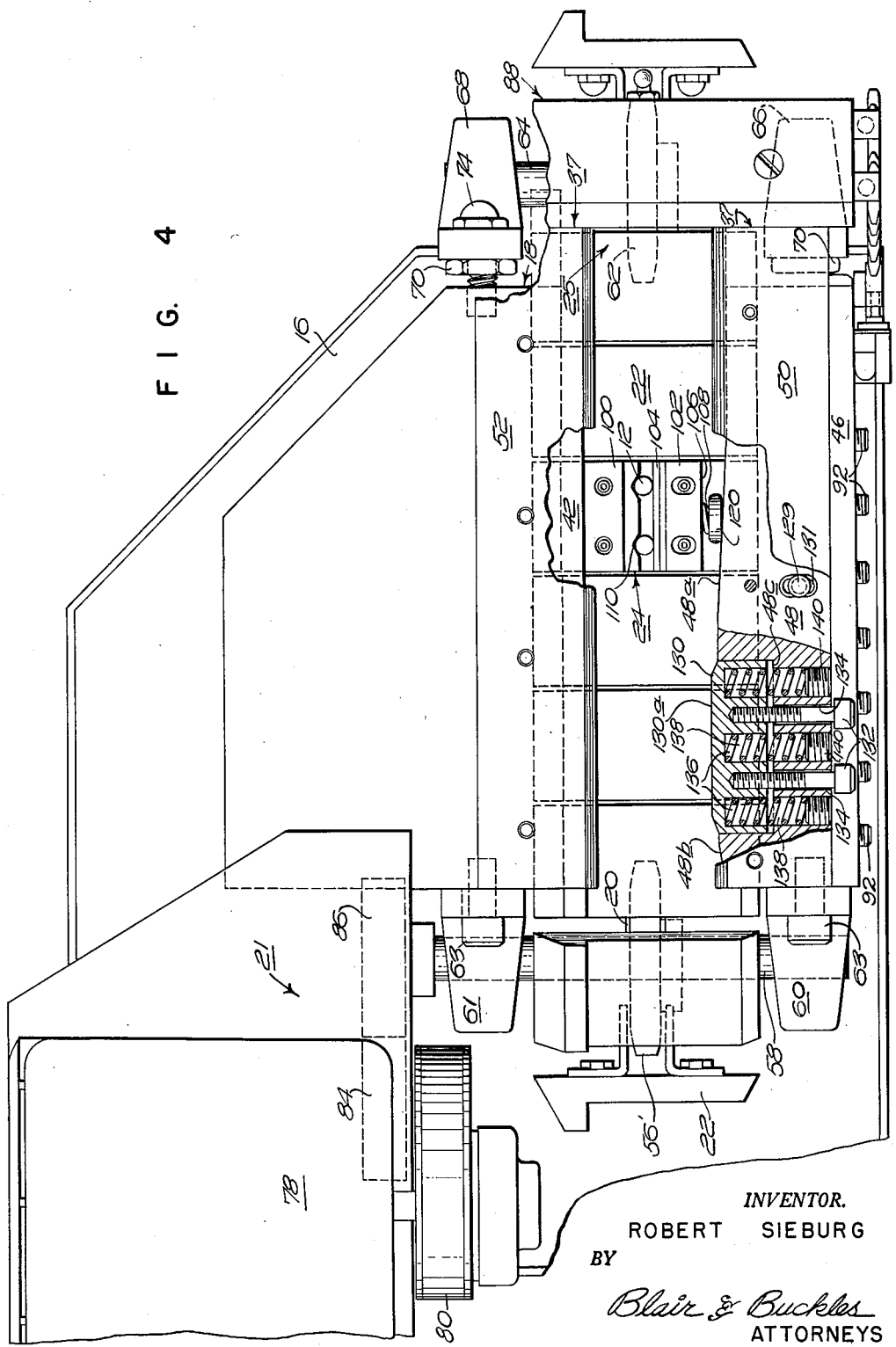
INVENTOR.
ROBERT SIEBURG
BY
*Blair & Buckles*
ATTORNEYS

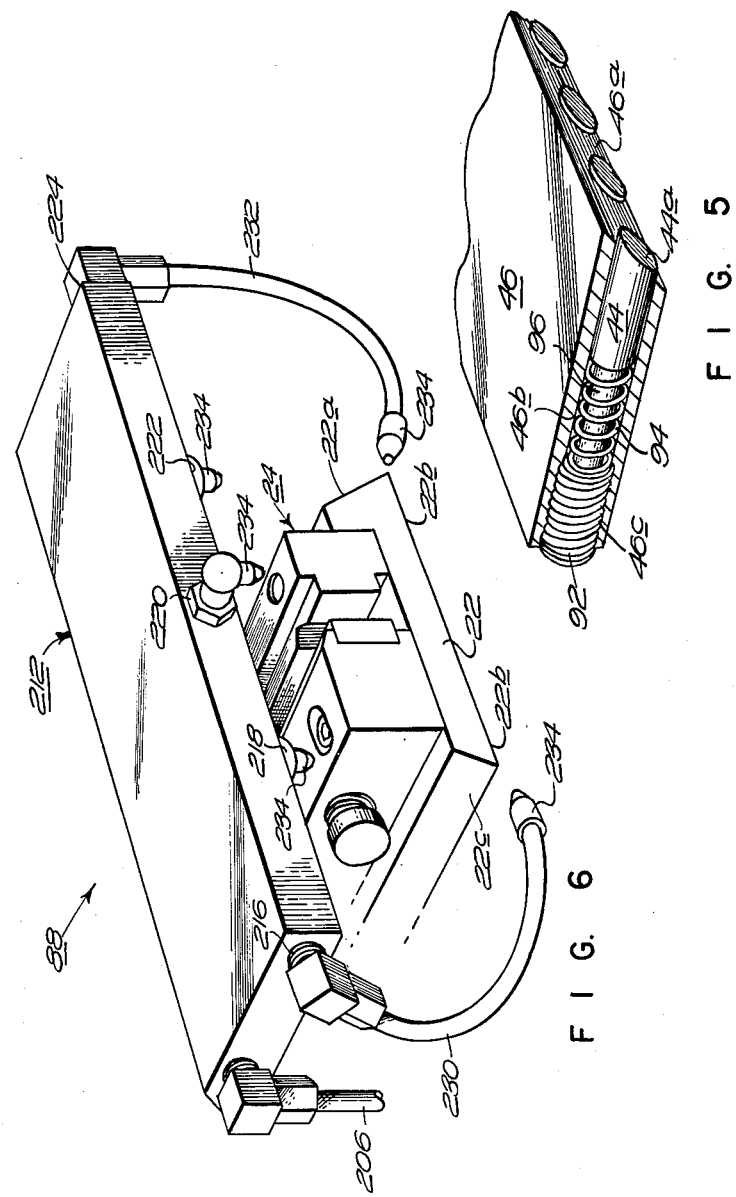

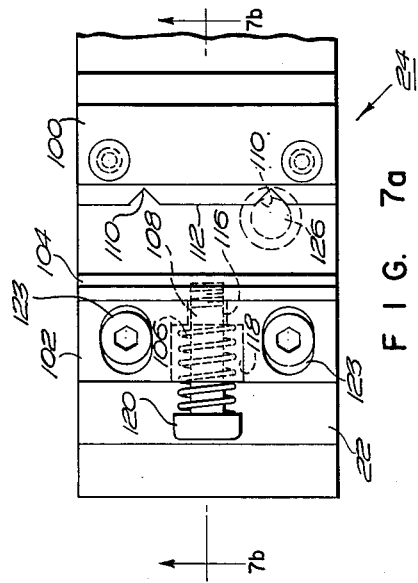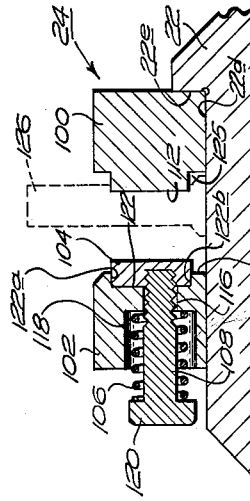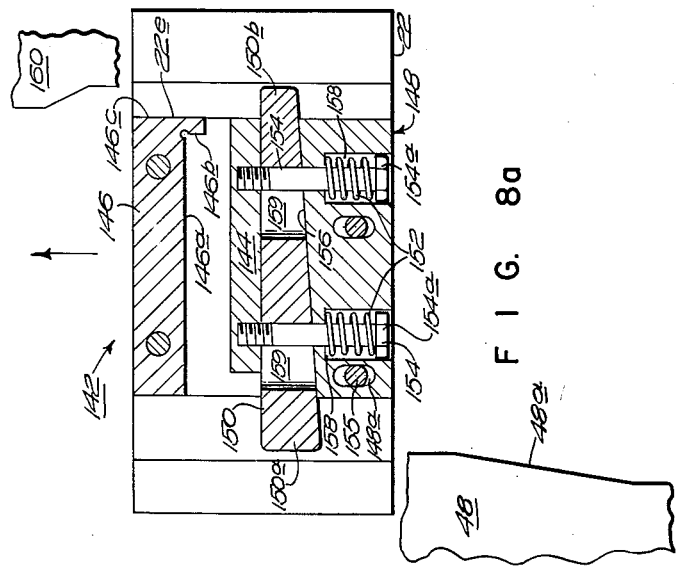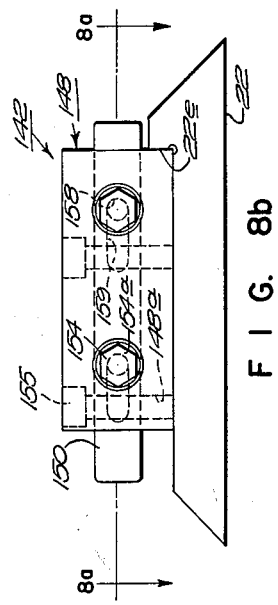

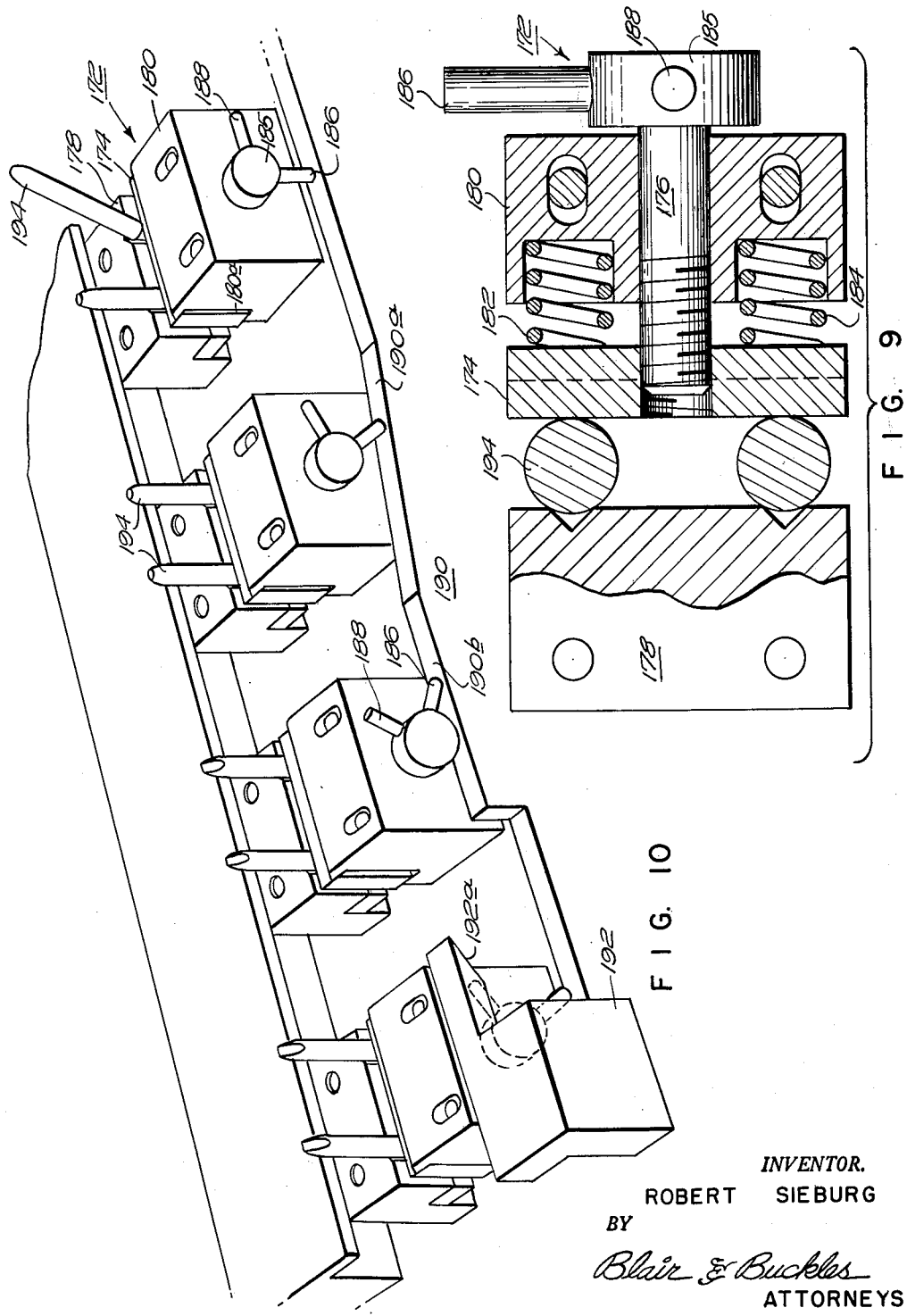

INVENTOR.
ROBERT SIEBURG
BY
*Blair & Buckles*
ATTORNEYS

3,077,973
Patented Feb. 19, 1963

3,077,973
WORK FEEDING SYSTEMS FOR MACHINING OPERATIONS
Robert Sieburg, Brookfield, Conn. % Sieburg Industries Inc., Danbury Industrial Park, Danbury, Conn.
Filed Nov. 9, 1960, Ser. No. 68,191
20 Claims. (Cl. 198—179)

This invention relates to a conveyor which carries work pieces into engagement with a tool such as a milling cutter. More particularly, it relates to an endless belt type conveyor which automatically clamps the work pieces and accurately positions them with relation to the tool so that they may be machined within exacting tolerances.

In certain machine tools, such as milling machines, the work pieces to be machined are clamped to movable tables which are then moved to bring the work pieces into engagement with various rotating tools. Obviously, while the operator is clamping or removing a work piece, the machining operation is at a standstill. Moreover, where a number of like work pieces are to be identically machined, the machine tool is set up for the desired operation, and thereafter the above procedures are mechanically repeated by the operator, with little, if any, requirement for skill. A situation of this type is generally regarded as ripe for automation.

In the prior art there are numerous devices for feeding work to a machine tool by means of an endless belt conveyor. Some require each work piece to have a special shape so as to interfit with a standard clamp carried by the conveyor belt. The provision of such shapes, which are not otherwise needed and often must be removed in order to use the work piece, largely vitiates the advantages of automatic feed.

Another automatic feed mechanism secures the work pieces with clamps engaging the surface that is to be machined. Thus, it is not possible to face the entire surface of the work piece with this apparatus. Still another feeder operates intermittently. That is, it aligns and clamps each work piece while the conveyor is stationary and then advances to engage the work piece with the tool. As compared with a continuously running system, this machine is relatively slow and inefficient.

Other prior conveyor devices do not combine the features of automatic feed equipment with accurate machining. One of the more serious deficiencies is the inaccurate positioning of the work pieces, which precludes machining to reasonably close tolerances. In fact, for this and other reasons, none of the prior machines have proven commercially practical.

Accordingly, it is a principal object of my invention to provide an improved machine tool, such as a milling machine or the like, in which the work pieces are continuously fed to a tool which operates on them.

A further object of my invention is to provide an improved conveyor for automatically feeding work pieces to a machine tool.

Another object of my invention is to provide a conveyor of the above type that can readily be used with conventional milling machines.

A general object is to provide a conveyor which automatically and securely clamps objects it transports and accurately positions them with respect to a milling tool or the like.

A further object is to provide a continuously moving automatic conveyor of the above type with which successive work pieces can be machined without interruption.

A still further object is to provide an automatic conveyor of the above type for machining work pieces with accuracy comparable to manually fed milling machines.

Another object of my invention is to provide a conveyor of the above type that is relatively simple in design, requires little space and is economical to operate.

Other objects of the invention will in part be obvious and will in part appear hereinafter.

The invention accordingly comprises the features of construction, combinations of elements and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIGURE 1 is a fragmentary perspective view of a milling machine incorporating a conveyor embodying my invention, FIGURE 2 is a side elevation view, partly broken away, of the conveyor of FIGURE 1, FIGURE 3 is a vertical sectional view taken along line 3—3 of FIGURE 2, FIGURE 4 is a top plan view, partly broken away, of the conveyor of FIGURE 1, FIGURE 5 is a fragmentary perspective view, partly broken away, of the pressure plate assembly used in the conveyor of FIGURE 1, FIGURE 6 is a perspective view of the air blast system used to clean the clamping fixtures and the carrying blocks of the conveyor, FIGURE 7a is a horizontal view of the clamping fixture shown in the conveyor of FIGURE 1, FIGURE 7b is a vertical sectional view taken along line 7b—7b of FIGURE 7a, FIGURE 8a is a top plan view, partly in section, of another clamping fixture which may be used in my conveyor, FIGURE 8b is an end view of the clamping fixture of FIGURE 8a; FIGURE 8a is taken along the section line 8a—8a of this figure, FIGURE 9 is a top plan view, partly broken away, of yet another clamping fixture incorporating the principles of my invention.

Figure 12B:
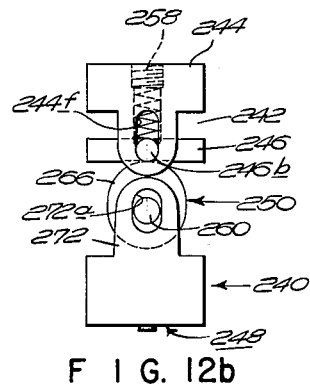
Figure 11A:
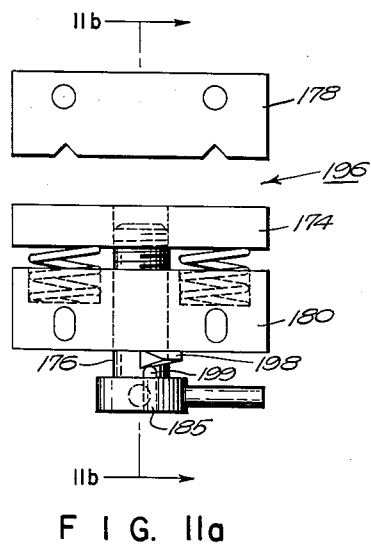
Figure 11B:
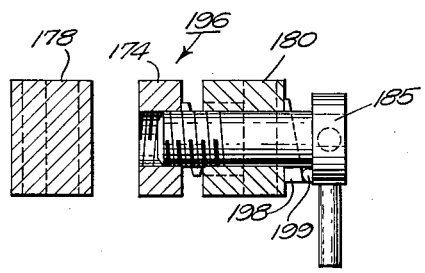

FIGURE 10 is a fragmentary perspective view of a conveyor using the clamping fixture of FIGURE 9, FIGURE 11a is a top plan view of a further clamping fixture embodying the features of my invention, FIGURE 11b is a vertical section taken along line 11b—11b of FIGURE 11a, FIGURE 12a is a top plan view of still another clamping fixture which may be used in the conveyor, FIGURE 12b is an end view of the fixture of FIGURE 12a.

In general, an automatic milling machine embodying principles of my invention includes a continuously driven chain belt conveyor carrying a plurality of clamping fixtures affixed to the links of the belt. Work pieces are inserted between open jaws of the fixtures and are automatically aligned and clamped by closure of the jaws as the conveyor belt advances. After the work pieces are fed to the milling tool, the fixtures are inverted and the jaws open, thus automatically releasing the work pieces.

Each clamping fixture is maintained against stationary ways as it advances past the cutting tool, and, therefore, one of the clamping jaws, tightly secured to the fixture, maintains a fixed position with respect to the tool. Thus, work pieces clamped against the fixed jaw by a movable jaw are accurately positioned with respect to the cutting tool, and machining tolerances are substantially enhanced as compared to prior devices.

Wear is reduced and accuracy further improved by removal of chips and other foreign matter from the jaws and the aligning members with several blasts of air prior to entry of the fixtures into the ways.

I have found that another reason for poor machining tolerances in conveyor-fed automatic milling machines is that the clamps holding the work pieces chatter during engagement of the work with the cutting tool. By combining specially shaped ways with a readily adjustable positive clamping action restraining the work piece fixtures in the ways, I have substantially eliminated this problem.

The clamping jaws are spring loaded. They are cammed shut by a stationary member as they approach the tool and are opened after they leave it. For example, in one embodiment, they are closed by being forced through a constricted passage. Another embodiment combines a screw and a cam to achieve a wide-opening jaw. Still another fixture employs a cammed wedge to operate a clamp which opens in the direction of travel of the conveyor.

Collets or vertically-rotatable clamping members mounted on the aligning members may also be used to grip the work piece.

Referring to FIGURE 1, a conveyor generally indicated at 10, embodying my invention, carries work pieces 12 into engagement with a milling cutter 14. The conveyor 10 has a base plate 16 affixed to the bed of a conventional milling machine and a housing generally indicated at 18 attached to the base plate 16. A chain belt 20, suspended between the ends of the housing 18, is driven by a power unit generally indicated at 21; carrying blocks 22, with clamping fixtures 24 mounted thereon, are affixed to the belt 20 to transport the work pieces 12.

More specifically, in a feed area generally indicated at 25, the work pieces 12 are loaded into open clamping fixtures 24. As the belt 20 carries the work pieces 12 toward the milling cutter 14, the fixtures 24 are automatically closed to align and tightly clamp the work pieces. The work pieces 12 are machined as they pass under the milling cutter 14, and the clamping fixtures 24 then open and invert, allowing the work pieces 12 to drop out.

As shown in FIGURES 2 and 3, the housing 18 is preferably a unitary structure having four legs 28 joined by horizontal longitudinal members 30 and transverse members 32. Referring to FIGURE 3, a pair of top plates 34 and 38, fastened to the members 30 and 32, are cut away to support removable guide blocks 36 and 40, which form the bottom surface of ways indicated generally at 37—37. The ways 37 also include the canted surface 42a of a guide block 42 and beveled surfaces 44a of pins 44 protruding from a pressure plate 46. The carrying blocks 22 are shaped to ride along the ways 37, each of the blocks 22 being bolted to the tabs 53 of a link 54 on the belt 20. The housing 18 also supports a constriction plate 48, described in greater detail below, and cover plates 50 and 52.

Referring now to FIGURES 1 and 4, the belt 20 is suspended at one end of housing 18 from a drive sprocket 56 keyed to a shaft 58. The shaft is journalled in pillow blocks 60 and 61 secured to legs 28 of the housing 18 by bolts 63. As best seen in FIGURE 4, the belt is supported at the other end of housing 18 by a similar sprocket 62 mounted on a shaft 64 journalled in pillow blocks 66 and 68. The blocks 66 and 68 in turn are supported on mounting bolts 74 threaded into the housing 18. They bear against nuts 70 which may be turned toward the housing to develop slack in the belt 20. The belt can then be readily removed or replaced.

Still referring to FIGURES 1 and 4, the power unit 21 includes a motor 78 connected by a drive belt 80 to a gear reduction box 82. Mechanical output from the box 82 is by way of a gear 84 (FIGURE 4) coupled to shaft 58 by a gear 86. With rotation of the gear 86, the belt 20 carries the blocks 22 and the fixtures 24 from the feed area 25 along the ways 37, over the drive sprocket 56, back under the ways and over the sprocket 62 back to the feed area. Ways 37 are preferably flared open at the entrance thereof to facilitate entry of the blocks 22 therein, thus preventing binding and jamming. A cleaning fixture generally indicated at 88 utilizes blasts of air, in a manner described below, to remove chips, cutting oil and other abrasives from the blocks 22 and clamping fixtures 24 prior to entry of the blocks 22 into the ways 37. Belt 20, carrying blocks 22 and clamping fixtures 24 are shielded from falling chips, cutting oil and other abrasives by the cover plates 50 and 52, mentioned above, and by a roof 90 (FIGURES 2 and 3) extending over the returning belt. The roof 90 may be cast integral with housing 18.

Referring now to FIGURE 3, the guide blocks 36 and 40 are preferably made of hardened steel and have accurately ground parallel guide surfaces 36a and 40a. The blocks 36 and 40 are removably fastened to the plates 34 and 38 by bolts 91 to facilitate resurfacing or replacement when they become worn. The trapezoidal guide block 42 is similarly secured to top plate 38. It is parallel to guide blocks 36 and 40, and its surface 42a defines an acute angle with the surface 40a. The pressure plate 46, which is bolted to top plate 34, has a series of horizontal holes 46b extending through a surface 46a facing the blocks 22. The holes 46b house the pressure pins 44.

As seen in FIGURE 5, each of the holes 46b has an enlarged threaded portion 46c at the end remote from the surface 46a. The pressure pins 44 have beveled surfaces 44a angled to fit flush against the surfaces of the carrying blocks 22 engaged by them (FIGURE 3). A screw 92 in each threaded portion 46c compresses a spring 94 against a pin 44.

Returning to FIGURE 3, each of the carrying blocks 22 is formed of hardened steel with accurately machined outer guide surfaces 22a, 22b and 22c oriented to simultaneously engage the surfaces 42a, 40a, 36a and 44a, respectively. To position the clamping fixtures 24 with respect to the guide surfaces 22a, 22b and 22c, the carrying blocks are provided with accurate perpendicular inner surfaces 22d and 22e, against which the fixtures are disposed. More specifically, each clamping fixture 24 has a fixed reference jaw bearing against the reference surfaces 22d and 22e and, as described below, a second jaw movable to clamp a work piece against the fixed jaw.

As the carrying blocks 22 enter the ways 37, they engage the pressure pins 44, which urge them against the guide surfaces 36a, 40a and 42a. Because of the angle of the surfaces 22c with respect to the horizontal, the forces applied to these surfaces by the pins 44 have both vertical and horizontal components. This forces the blocks 22 downwardly against the guide block 36 and to the right (FIGURE 3) against the block 42. The angle of the surface 42a provides a downward force on the block 22 urging it against the guide block 40. Thus, the reference surfaces 22d and 22e, against which the fixtures 24 are disposed, are accurately located with respect to the ways. In the holes 46b near the entrance of the ways 37, the screws 92 are set for minimum force on the carrying blocks 22 by the pins 46. Thus, the blocks 22 encounter little interference in entering the ways. However, in successive holes 46b, the screws 92 are set to provide ever increasing forces. Consequently, as the blocks 22 progress through the ways, they are pushed against the reference surfaces 36a, 40a and 42a with greater and greater force to ensure accurate positioning.

Turning now to FIGURE 5, in the vicinity of the milling cutter 14 (FIGURE 1) pins 96 are disposed between and in engagement with the screws 92 and pins 44. This permits a positive setting of the positions of the pins 44 to provide exactly the clearance required for passage of the carrying blocks 22. Thus, the carrying blocks are accurately positioned in the ways and securely restrained from both transverse horizontal and vertical movement during machining. There is none of the chatter found in many prior conveyor-fed machine tools, caused by the tool's cutting surface engaging the work pieces. Furthermore, the spring pressure on the pins 44 applies sufficient force on the blocks 22 to maintain the advancing belt under considerable tension, whereby the work pieces are advanced at a substantially constant speed. It should be noted that the returning belt does not have to be taut but, as seen in FIGURE 2, may have substantial slack.

To prevent the pressure pins 44 from rotating and thereby jamming the conveyor when the carrying blocks 22 initially engage the beveled surfaces 44a, the diameter of the pins 44 is made gerater than twice the spacing between adjacent carrying blocks; preferably, the pin diameter is three times the block spacing.

Referring to FIGURES 7a and 7b, a clamping fixture generally indicated at 24, of the type shown also in FIGURE 1, comprises a reference jaw 100, a stationary member 102, a movable clamping jaw 104, a spring 106 and a cam follower rod 108. The reference jaw 100 preferably has one or more vertical V-grooves 110 machined in a jaw surface 112 to locate work pieces in the fixture. The support member 102 has a clearance hole 116 for the rod 108, with a counterbore 118 to receive the spring 106 and the enlarged head 120 of the rod 108. It also has a recess 122 whose walls 122a and 122b guide the movement of the movable jaw 104. The movable jaw 104, which is threaded onto the end of the rod 108, is urged against the support member 102 and away from the reference jaw 100 by compression of the spring 106 against the head 120. The hole 116 is large enough for the clamping jaw 104 and rod 108 to rock about the vertical axis to clamp simultaneously two work pieces of slightly different thickness.

As seen in FIGURE 7b, a recess 124 below the clamping jaw 104 and a recess 125 below the reference jaw 100 facilitate clamping of a work piece 126 having an enlarged head. The reference jaw 100 and the support member 102 are bolted to the carrying block 22. The reference jaw bears against the surfaces 22d and 22e of the block, and the member 102 has slotted mounting holes 123 to allow adjustment of its position for various sizes of work pieces. The jaw 104 is moved to the right (FIGURES 7a and 7b), to clamp work pieces against the jaw 100, by a cam incorporated in the constriction plate 48. The fixture 24 is reopened by the spring 106, to release the work pieces, after leaving the cam.

More particularly, as shown in FIGURE 4, the constriction plate 48, which is adjustably fastened to the pressure plate 46 by bolts 129 extending through slotted holes 131, is provided with skewed surfaces 48a and 48b, facing across the ways 37, and a recess 48c. The recess accommodates a cam shoe 130 between the surfaces 48a and 48b. The cam shoe 130 is secured by machine screws 132 that pass through clearance holes 134 in the constriction plate. It is resiliently urged away from the constriction plate by heavy springs 136 disposed in holes 138 extending through the constriction plate and into the cam shoe. The springs are retained in the holes 138 by screws 140, which are also used to adjust their compression. The screws 132 are adjusted to locate the surface 130a of the cam shoe somewhat farther across the ways 37 than the adjoining portions of the surfaces 48a and 48b.

Accordingly, as seen in FIGURE 4, when the carrying blocks 22 first enter the ways 37, plate 48 permits the springs 106 of the fixtures 24 to open the fixtures to the fullest extent. The work pieces 12 may then be easily dropped into position between the jaws 100 and 104 (see FIGURE 1). As the fixtures 24 advance, the heads 120 of the cam follower rods 108 gradually engage the surface 48a of the constriction plate (see FIGURE 3) and movement along the angled surface forces the rod 108 and clamping jaw 104 toward the reference jaw 100, thereby aligning the work pieces in the grooves 110 and clamping them there.

When the head 120 engages the cam shoe 130, the clamping jaw 104 is more strongly urged toward the reference jaw 100, clamping the work pieces with a force equal to the difference between the force exerted by the relatively stiff springs 136 in the shoe 130 and the force of the substantially weaker spring 106. The work pieces are machined while the fixture is clamped shut by the cam shoe. Afterward the head 120 engages the surface 48b, which allows the clamping fixture to gradually open under the force of spring 106. When the fixture 24 inverts to return to the entrance of the ways 37, the work pieces 12 drop therefrom.

Turning next to FIGURES 8a and 8b, a clamping fixture generally indicated at 142 has a jaw 144 movable in a direction parallel to the conveyor movement. The clamping fixture 142 comprises, in addition, a stationary reference jaw 146, a cam block generally indicated at 148 and a wedge 150. A pair of springs 152 are disposed around machine screws 154 which extend through the block 148 and wedge 150 and are threaded into the jaw 144. The reference jaw 146 has a clamping surface 146a, a reference surface 146b and a side surface 146c. The jaw 146 is bolted to the carrying block 22, with the surface 146c positioned against the surface 22e of a carrying block 22 (FIGURE 8a), thereby accurately positioning surface 146b with respect to the ways 37 (FIGURE 3). The cam block 148 is fastened down by bolts 155 extending through holes 148a. The holes 148a are slotted to permit adjustment of the position of the block 148 and movable jaw 146 for work pieces having different sizes.

More specifically, as best seen in FIGURE 8a, cam block 148 has a camming surface 156 and a pair of counterbored holes 158, accommodating the springs 152 and screws 154. The wedge 150 has slots 159 which permit leftward and rightward movement of the wedge without interference from the screws 154. The springs 152, which are in compression between the block 148 and the heads 154a of the screws 154, urge the movable jaw 144 away from the jaw 146. From FIGURE 8a it will be apparent that movement of the wedge 150 to the right and left (FIGURE 8a) moves jaw 144 toward and away from the jaw surface 146a.

Clamping fixture 142 is closed by engagement of the end 150a of the wedge 150 with the surface 48a of the constriction plate 48 and then with cam shoe 130 (FIGURE 4) as the clamping fixture is advanced through the conveyor. After the clamping fixture passes the cam shoe 130, the small end 150b of the wedge engages a cam 160 (FIGURE 8a) attached to the housing 18, which pushes the wedge to the left. This allows the springs 152 to move the movable jaw 144 away from the reference jaw 146, thereby opening the fixture 142.

Still referring to FIGURE 8a, work pieces in fixtures 142 can readily be machined in a direction transverse to their longest sides. The work pieces may be accurately located, with respect to the tool operating on them, by being positioned against the reference surface 146b. This may be accomplished by a guide mechanism (not shown) comprising several spring-loaded members mounted above the cam plate and adapted to urge the work piece against surface 146b prior to closure of fixture 142.

Another clamping fixture embodying features of my invention is indicated generally at 172 in FIGURE 9. The fixture 172 has a movable jaw 174 threaded on the end of a rod 176, and, rotation of the rod by cams, moves the jaw 174 toward and away from a fixed jaw 178 to close and open the fixture in a lead screw type operation.

More specifically, the movable jaw 174 is disposed between the jaw 178 and a support member 180. It is resiliently urged toward the jaw 178 by springs 182 and 184. The rod 176 has an enlarged head 185 fitted with two cam follower pins 186 and 188 disposed preferably at right angles to each other. Movement of jaw 174 is guided by a groove 180a extending across the support member 180 (FIGURE 10). The jaw 178 and the support member 180 are bolted to the carrying blocks 22 in the manner described above with respect to the fixtures 24, and, preferably, they are formed with the above described recesses to clamp work pieces having enlarged heads or flanges.

Referring to FIGURE 10, the clamping fixtures 172 are operated by two cam plates 190 and 192 as they advance through the machine. The cam plates are disposed above the pressure plate 46 (FIGURE 3) in place of the constriction plate 48. Initially, when each clamping fixture 172 is in the feed area, i.e., immediately after entering the ways 37, the fixture 172 is open, allowing work pieces 194 to be inserted between the jaws. As the fixture advances, pin 186 engages an upwardly sloping surface 190a of cam plate 190. This unscrews rod 176 approximately one-quarter turn from movable jaw 174, allowing springs 182 and 184 to urge the movable jaw toward the reference jaw 178, and thereby clamping the work pieces. As the fixture 172 passes beneath the milling cutter (not shown in FIGURE 10), rod 176 is maintained in position by a flat surface 190b of the cam plate 190.

Still referring to FIGURE 10, after the work pieces pass the cutter 14, the cam follower pin 188 engages the downwardly sloping surface 192a of cam plate 192. This rotates the rod 176 and threads it back into movable jaw 174, thereby pulling the jaw away from the reference jaw 178 and opening the fixture.

A clamping fixture indicated at 196 in FIGURES 11a and 11b is similar to the fixture 172, except that a cam 198 is mounted on the support member 180 to achieve wider opening of the jaws. The cam 198 has a helical surface in engagement with a pin 199 projecting from the head 185. During rotation of the rod 176, in the manner described above to open the fixture, the cam 198 forces the head 185 and rod 176 outwardly and away from the stationary jaw 178. This movement is imparted to the movable jaw 174, which is at the same time being retracted by the lead screw type movement described above. The displacement of the jaw 174 is thus substantially greater than it would be with the lead screw action alone. During closure of the fixture 196, the motion is in the opposite direction, with the head 185 moving inwardly toward the member 180 at the same time that the rod 176 partially withdraws from the jaw 174.

Turning now to FIGURES 12a and 12b, a clamping fixture generally indicated at 240 has an aperture 242 extending transverse to the feed direction, which is indicated by an arrow 241. The fixture 240, which is actuated by the cam plates 190 and 192 of FIGURE 10, comprises a fixed reference jaw 244 supporting a movable jaw 246 on arms 244a and 244b. A support member, generally indicated at 248, supports a rotatable eccentric cam, indicated generally at 250, which bears against the jaw 246. Rotation of the cam 250 moves the jaw 246 toward and away from jaw 244 to close and open the fixture 240.

More specifically, referring to FIGURE 12a, the jaw 244 also has a clamping surface 244c, a first reference surface 244d for locating the jaw on a carrying block 22 (FIGURE 3) and a second reference surface 244e against which work pieces may be positioned. The movable jaw 246 is guided by end pins 246a and 246b disposed in slots in the arms 244a and 244b. The slot 244f, accommodating the pin 246b and spring 254 in arm 244b, is shown in FIGURE 12b. The jaw 246 is resiliently urged away from jaw 244 by springs 252 and 254 compressed in the slots between the end pins 244a and 244b and adjusting screws 256 and 258.

Eccentric cam 250 has shaft portions 260 and 262 on each end coaxial with a central bearing portion 264. The shaft portions are journalled in slots 270a and 272a in arms 270 and 272 extending from the support member 248. The cam 250 also has eccentric portions 266 and 268 intermediate the central portion and the shaft portions. Pins 186 and 188, extending from a head 185 affixed to the shaft portion 260, serves to rotate the cam 250 in the same manner as in the fixture 172 of FIGURES 9 and 10.

Still referring to FIGURES 12a and 12b, a hole 274, extending through the center of member 248, is threaded at one end to receive an adjusting screw 276. A yoke 278, fitting around the central portion 264 of the cam 250, has a stub portion 278a within the hole 274. A spring 280 is compressed in hole 274 between the screw 276 and yoke 278. In the view of FIGURE 12a, with the pin 186 in a more or less horizontal orientation, the fixture 240 is "closed" (in accordance with the camming system of FIGURE 10). That is, the movable jaw 246 is in its leftmost position, having been forced there by the eccentric portions 266 and 268. When the cam 250 is rotated to bring the pin 186 vertically downward from the head 185, the eccentric portions 266 and 268 present the jaw 244 surfaces which are closer to the axis of cam rotation, i.e., farther to the right. The jaw 244 is therefore moved to the right by the springs 252 and 254 to open the fixture and permit removal of the work piece therein.

The manner in which I remove chips and other dirt from the clamping fixtures and the guide surfaces of the carrying blocks to substantially improve machining tolerances and reduce wear on the more critical parts of my conveyor will now be described. Referring to FIGURE 1, the cleaning fixture 88 is secured to the cover plates 50 and 52 at the feed end of the conveyor apparatus 10. An air valve generally indicated at 200 is mounted on the side of housing 18 with an input tube 202 delivering air to the valve from an air compressor (not shown). An output tube 206 from the valve runs to a manifold indicated generally at 212. The air valve 200 has a plunger 213 actuated by a sprocket-like cam 214 to deliver short bursts of air to the manifold 212.

Referring now to FIGURE 6, the manifold 212 has five output ports 216, 218, 220, 222 and 224 from which air is directed to the guide surfaces 22a, 22b and 22c of the carrying blocks and to the clamping fixtures 24. The ports 218, 220 and 222 are fitted with nozzles 234, as are tubes 230 and 232 connected to ports 216 and 224. The tubes direct air against the horizontal guide surfaces 22b of the carrying blocks 22. The nozzles on the ports 218 and 222 project air against the beveled guide surfaces 22a and 22c, and the nozzle connected to output 220 directs it to the clamping surfaces and movable jaw of the clamping fixture 24.

Cam 214 (FIGURE 1), which is mounted on shaft 64, actuates the valve 200 in synchronism with the movement of belt 20. In this manner, several (e.g., four) short blasts of air are directed against each carrying block 22 and clamping fixture prior to entry of the carrying block into the ways 37. The air blasts remove substantially all chips, cutting oil and other dirt from the guide surfaces on the carrying blocks and from the jaw members of the clamping fixtures, thereby allowing the carrying blocks to slide along the ways without jamming and with a minimum of wear and ensuring accurate alignment of the work pieces within the fixtures. I have found that intermittent blasts of this nature are more effective in cleaning than continuous air jets. Furthermore, they do not require the compressor capacity that is needed for continuous flow.

My automatic conveyor can be quickly set up to efficiently machine a short run of as few as 200 parts by mounting clamping fixtures on only a few of the carrying blocks attached to the belt. By using a two-speed drive mechanism with instantaneous speed control, the conveyor speed can be increased while the empty carrying blocks are passing under the cutting tool and then reduced for the proper machining speed when the work pieces are fed to the tool.

The two-speed drive may be achieved, for example, with a constant speed motor and an eddy current slip clutch, of well-known design, in which the current is varied to change the conveyor speed. The clutch current may be controlled by means of a switch or other control actuated by the clamping fixtures as they approach and then pass beyond the cutting tool.

In summary, I have described an improved automatic conveyor that securely clamps and accurately positions work pieces for various machining operations. The work pieces are held by fixtures that automatically close to clamp the pieces for machining and then open to release them. One of the clamping jaws of the fixture moves to secure the work piece against a fixed jaw whose clamping surface is a reference for accurate alignment.

From the above, it will be apparent that a variety of clamping fixtures can be used with my conveyor to adapt it for many different milling applications. The aperture of the fixture may be parallel or transverse to the feed direction, or at an intermediate angle for machining obliquely across the work piece. The travel of the movable jaw between the open and the closed positions can be varied over a wide range.

In one embodiment, the jaws are closed by moving the fixture through a constricted passage. In another embodiment, the jaws are engaged or disengaged by a lead screw automatically rotated by cams as the conveyor advances the fixture to the machine tool. Another embodiment combines a second cam with the above lead screw to increase the jaw travel, allowing work pieces with an enlarged bottom portion to be clamped.

A clamping fixture in which the jaws move parallel to the feed direction incorporates a wedge urged into the fixture to close the jaws. After machining, the wedge is pushed back, allowing the spring-loaded jaws to open.

Other clamping fixtures may incorporate collets, eccentrics, or other gripping devices mounted on the sliding carrying blocks.

The clamping force is resiliently applied and is readily adjusted with each of the clamping fixtures. The clamping fixtures are fastened to carrying blocks which are attached to the conveyor belt, and the blocks move in engagement with guide blocks to ensure highly accurate positioning of the carrying blocks. The accuracy with which the work pieces are machined is substantially enhanced by this combination of stationary guiding surfaces that align the carrying blocks and stationary clamping jaws that are secured against reference surfaces on the carrying blocks.

The carrying blocks and the clamping fixtures are cleaned after each passage under the cutting tool by air blasts synchronized with the conveyor speed. By thus removing chips and other abrasive dirt, machining accuracy is further enhanced and clamping reliability and wear characteristics are substantially improved.

Milling operations that can be performed using my conveyor to feed the work pieces to the cutting tool include slotting, shaping and facing. The conveyor may also be used to feed work pieces in other machine tools, such as belt sanders, grinders, etc.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A machine to transport work pieces into engagement with a tool, said machine comprising ways having first and second intersecting guide surfaces, carrying blocks having slide surfaces slidably engaging said guide surfaces, motive means for moving said blocks along said ways in a direction parallel to the intersection of said guide surfaces, clamping fixtures attached to said blocks, each of said fixtures having a clamping surface and jaw means for clamping a workpiece against said clamping surface, said clamping surfaces of successive blocks having the same position with respect to said slide surfaces, and a successive plurality of independently-acting pressure members disposed along said ways, said members individually bearing against and uring said blocks against said guide surfaces so that said workpieces are clamped and moved along a uniformly accurate path during engagement with the tool, whereby each block is positively urged against said guide surfaces as the block carries a workpiece through engagement with the tool.

2. The combination defined in claim 1 further comprising cleaning means operable to remove abrasive material from said slide surfaces prior to the entry of said carrying blocks into said ways, said cleaning means comprising a reservoir for fluid under pressure and a plurality of conduits positioned to direct said fluid toward each of said slide surfaces.

3. A conveyor adapted to transport work pieces into engagement with a tool, said conveyor comprising, in combination, ways having first and second guide surfaces lying in intersecting planes, carrying blocks having slide surfaces slidably engaging said slide surfaces, means urging said blocks against said guide surfaces, means for moving said blocks along said guide surfaces in a direction parallel to the intersection of said planes, clamping fixtures attached to said blocks, each of said fixtures having a clamping surface and means for clamping a work piece against said clamping surface, said clamping surfaces of successive blocks having the same position with respect to said slide surfaces so that said work pieces are clamped and moved along a uniformly accurate path into and out of engagement with said tool, each of said fixtures including a fixed jaw and a movable jaw, said clamping surfaces being formed on said fixed jaw, means for moving said movable jaw toward said clamping surface at a first location along said ways and away from said clamping surface at a second location reached by said blocks after passing said first location, said means for moving said movable jaws including a member attached to the carrying block, a shaft extending through said member and threadedly connected to said movable jaw, said shaft having an extending portion on the opposite side of said member from said movable jaw, resilient means urging said movable jaw away from said member and toward said clamping surface, a pair of pins extending radially from said extending portion, and stationary camming means extending generally along the direction of travel of said fixtures along the direction of travel of said fixtures along said ways and disposed to engage said pins and thereby rotate said shaft to screw it out of said movable jaw in said first location and into said movable jaw in said second location.

4. The combination defined in claim 3 including a helical cam on said member adjacent to said extending portion of said shaft and concentric with said shaft, and a cam follower attached to said shaft and in engagement with said helical cam, the pitch of said helical cam being such as to move said extending portion away from said member in said second location and permit said extending portion to move toward said member in said first location.

5. A conveyor adapted to transport work pieces into engagement with a tool, said conveyor comprising, in combination, ways having first and second guide surfaces lying in intersecting planes, carrying blocks having slide surfaces slidably engaging said guide surfaces, means urging said blocks against said guide surfaces, means for moving said blocks along said guide surfaces in a direction parallel to the intersection of said planes, clamping fixtures attached to said blocks, each of said fixtures having a clamping surface and means for clamping a work piece against said clamping surface, said clamping surfaces of successive blocks having the same position with respect to said slide surfaces so that said work pieces are clamped and moved along a uniformally accurate path into and out of engagement with said tool, each of said fixtures including a fixed jaw and a movable jaw, said clamping surface being formed on said fixed jaw, means for moving said movable jaw toward said clamping surface at a first location along said ways and away from said clamping surface at a second location reached by said blocks after passing said first location, said means for moving each of said movable jaws including a member attached to the block carrying the jaw, a shaft extending through said member and rotatably connected to said movable jaw, said shaft having an enlarged portion on the opposite side of said member from said movable jaw, resilient means urging said movable jaw away from said member and toward said clamping surface, a pair of pins extending radially from said enlarged portion, helical camming means on said member adjacent to said enlarged portion, a cam follower attached to said shaft and engaging said helical cam, and stationary camming means extending generally along said direction of travel and disposed to engage said pins to rotate said shaft in one direction in said first location and in the opposite direction in said second location, the pitch of said helical cam being such as to move said enlarged portion of said shaft away from said member in said second location and permit it to return toward said member in said first location.

6. A conveyor adapted to transport work pieces into engagement with a tool, said conveyor comprising, in combination, ways having first and second guide surfaces lying in intersecting planes, carrying blocks having slide surfaces slidably engaging said guide surfaces, means urging said blocks against said guide surfaces, means for moving said blocks along said guide surfaces in a direction parallel to the intersection of said planes, clamping fixtures attached to said blocks, each of said fixtures having a clamping surface and means for clamping a work piece against said clamping surface, said clamping surfaces of successive blocks having the same position with respect to said slide surfaces so that said work pieces are clamped and moved along a uniformly accurate path into and out of engagement with said tool, each of said fixtures including a fixed jaw and a movable jaw, said clamping surface being formed on said fixed jaw, means for moving said movable jaw toward said clamping surface at a first location along said ways and away from said clamping surface at a second location reached by said blocks after passing said first location, said clamping surfaces being angled to the direction of travel of said blocks, each of said fixtures including a member attached to the carrying block supporting the fixture and disposed on the opposite side of said movable jaw from said clamping surface, said member having a cam surface facing said movable jaw and angled to said direction of travel, a wedge disposed between and in slidable engagement with said movable jaw and said cam surface, resilient means urging said movable jaw against said wedge, and stationary camming means disposed along said direction of travel, said stationary camming means being arranged to force said wedge in a first direction perpendicular to said direction of travel at said first location and in the opposite direction to said first direction at said second location.

7. A conveyor adapted to transport work pieces into engagement with a tool, said conveyor comprising, in combination, ways having first and second guide surfaces lying in intersecting planes, carrying blocks having slide surfaces slidably engaging said slide surfaces, means urging said blocks against said guide surfaces, means for moving said blocks along said guide surfaces in a direction parallel to the intersection of said planes, clamping fixtures attached to said blocks, each of said fixtures having a clamping surface and means for clamping a work piece against said clamping surface, said clamping surfaces of successive blocks having the same position with respect to said slide surfaces so that said work pieces are clamped and moved along a uniformly accurate path into and out of engagement with said tool, each of said fixtures including a fixed jaw and a movable jaw, said clamping surface being formed on said fixed jaw, means for moving said movable jaw toward said clamping surface at a first location along said ways and away from said clamping surface at a second location reached by said blocks after passing said first location, said clamping surfaces being angled to the direction of travel of said fixtures, each of said fixtures including an eccentric shaft journalled for rotation about an axis substantially parallel to said clamping surface, means urging said movable jaw against said shaft, and a pair of pins connected to said shaft and extending radially from said axis, and camming means disposed along said direction of travel and arranged to engage said pins so as to rotate said eccentric shaft in a first direction at said first location and in a second direction opposite to said first direction in said second location.

8. A conveyor adapted to transport work pieces into engagement with a tool, said conveyor comprising, in combination, ways having first and second guide surfaces lying in intersecting planes forming an acute angle with each other, carrying blocks having slide surfaces shaped for sliding engagement with said guide surfaces, an endless belt, drive means connected to move said belt, said blocks being mounted on said belt, said belt being disposed to carry said blocks along a continuous closed path from the entrance of said ways past a loading station and a machining station to the exit of said ways with said slide surfaces engaging said guide surfaces, said path being positioned to then return said blocks to the entrance of said ways, a plurality of spring-loaded pins spaced along said ways and urging said blocks against said guide surfaces, said pins being constructed to exert a horizontally-acting force on said blocks, and clamping fixtures attached to said blocks, each of said fixtures having a clamping surface and means for clamping a work piece against said clamping surface during passage of each said block past said machining station.

9. The combination defined in claim 8 in which said pins exert increasing forces on said carrying blocks as they progress along said ways from the entrance thereof toward said machining station.

10. The combination defined in claim 8 including compressed air conduits at the entrance of said ways positioned to direct blasts of air toward each of said slide surfaces to clear said surfaces of dust, chips, or foreign matter.

11. A conveyor adapted to transport work pieces into engagement with a tool, said conveyor comprising, in combination, ways having first and second guide surfaces lying in first and second intersecting planes forming an acute angle with each other, carrying blocks having first and second slide surfaces adapted for sliding engagement with said first and second guide surfaces, an endless belt, drive means connected to move said belt, said blocks being mounted on said belt, said belt being disposed to carry said blocks along said ways in a direction parallel to the intersection of said first and second planes with said first and second slide surfaces facing said first and second guide surfaces, a member having a third guide surface, a plurality of spring-loaded pins urged against said blocks in said ways in a direction supplying a substantial force component transverse to the direction of travel of said blocks, the faces of said pins engaging said blocks forming a fourth guide surface, said third and fourth guide surfaces lying in third and fourth intersecting planes forming an acute angle opening toward said carrying blocks, the intersection of said third and fourth planes being parallel to the intersection of said first and second planes, said blocks having third and fourth slide surfaces engaging said third and fourth guide surfaces, clamping fixtures attached to said blocks, each of said fixtures having a clamping surface, and means for clamping a work piece against said clamping surface, said clamping surfaces each having the same orientation with respect to the respective slide surfaces.

12. The combination defined in claim 11 in which said carrying blocks are regularly spaced along said belt, the width of said pins in the direction of travel of said blocks being at least twice as great as the spacing between said blocks.

13. The combination defined in claim 11 including compressed air conduits positioned to direct intermittent blasts of air against each of said slide surfaces and said fixtures immediately prior to entry thereof into said ways and air control means coupled to said drive means to deliver compressed air to said conduits in synchronism with the motion of said belt.

14. The combination defined in claim 11 in which the pins engaging said carrying blocks exert increasing forces on them as said blocks progress from the entrance of said ways.

15. The combination defined in claim 11 including, in combination, a plurality of said pins substantially spaced along said ways from the entrance thereof, and adjustable means for positively moving said plurality of pins substantially into sliding engagement with said carrying blocks.

16. A conveyor adapted to transport work pieces into engagement with a tool, said conveyor comprising, in combination, ways having first and second guide surfaces lying in intersecting planes forming an acute angle with each other, carrying blocks having slide surfaces adapted for sliding engagement with said guide surfaces, an endless belt, drive means connected to said belt, said carrying blocks being mounted on said belt, means supporting said belt for movement of said blocks through said ways in a direction parallel to the intersection of said planes, with said guide surfaces facing said slide surfaces, a plurality of spring-loaded pins urging said blocks in said ways against said guide surfaces, clamping fixtures attached to said blocks, each of said fixtures including a fixed and a movable jaw, a clamping surface on said fixed jaw, said clamping surfaces having the same orientation with respect to said slide surfaces, means for moving said movable jaws toward said fixed jaws in a first loading station along said ways and away from said fixed jaws in a second unloading station passed by said blocks after passing said first station, said means including resilient means urging said movable jaws away from said fixed jaws, cam followers connected to said movable jaws and extending from said fixtures transversely of the direction of travel of said blocks in said ways, camming means extending along said ways and engaging said cam followers, said camming means having a surface engaging said cam followers, said surface having a first portion projecting gradually farther across said ways as said fixtures progress therealong, a second portion substantially parallel to said direction of travel and projecting farther across said ways than said first portion followed by a third portion whose projection across said ways diminishes as said fixtures advance therealong.

17. The combination defined in claim 16 including a cam shoe provided with a surface which forms said second portion of said camming surface, means mounting said shoe for movement transverse to said direction of travel, second resilient means urging said shoe across said ways, said second resilient means exerting a greater force on said movable jaws than said resilient means connected to said movable jaws.

18. The combination defined in claim 17 in which said cam shoe is positioned on the same side of said ways as said pins.

19. The combination defined in claim 8 in which said ways are provided with a tapered flared entrance into which said carrying blocks are successively guided by said belt.

20. A conveyor adapted to transport work pieces into engagement with a tool, said conveyor comprising, in combination, ways having first and second guide surfaces lying in intersecting planes, an endless belt, drive means connected to move said belt, carrying blocks mounted on said belt and having slide surfaces shaped for sliding engagement with said guide surfaces, said belt being disposed to carry said blocks along a continuous closed path from the entrance of said ways past a loading station and a machining station to the exit of said ways with said slide surfaces engaging said guide surfaces, said path being positioned to then return said blocks to the entrance of said ways, a plurality of spring-loaded pins spaced along said ways adjacent said tool and urging said blocks against said guide surfaces, said pins being constructed to urge said blocks toward the intersection of said intersecting planes, clamping fixtures attached to said blocks, each of said fixtures including a movable jaw, a fixed jaw having a clamping surface, and means for moving said movable jaw to clamp a work piece against said clamping surface including a member attached to each of said carrying blocks, a shaft supported by and extending through said member and threadedly connected to said movable jaw, a pair of pins protruding radially from the extending portion of said shaft, and camming means positioned adjacent to the path of said fixtures along said ways and disposed to engage said protruding pins and thereby rotate said shaft with respect to said movable jaw to urge said movable jaw toward said clamping surface at said machining station and away from said clamping surface in a second location.

References Cited in the file of this patent
UNITED STATES PATENTS

| | | |
|---|---|---|
| 261,524 | Bray | July 25, 1882 |
| 1,285,628 | Craley | Nov. 26, 1918 |
| 1,748,368 | Shaw | Feb. 25, 1930 |
| 2,864,412 | Ponder | Dec. 16, 1958 |

UNITED STATES PATENT OFFICE
CERTIFICATE OF CORRECTION

Patent No. 3,077,973

February 19, 1963

Robert Sieburg

It is hereby certified that error appears in the above numbered patent requiring correction and that the said Letters Patent should read as corrected below.

Column 5, line 11, for "gerater" read -- greater --; column 8, line 16, after "present" insert -- to --; column 10, line 9, for "uring" read -- urging --.

Signed and sealed this 8th day of October 1963.

(SEAL)
Attest:

ERNEST W. SWIDER
Attesting Officer

EDWIN L. REYNOLDS
Acting Commissioner of Patents